US007664716B2

(12) United States Patent
Kim

(10) Patent No.: US 7,664,716 B2
(45) Date of Patent: Feb. 16, 2010

(54) PROCESS AND APPARATUS FOR REALIZING A DIGITAL NEURAL NETWORK USING ELECTRONIC FAMILY

(75) Inventor: Hong-Sik Kim, Kangnam-gu (KR)

(73) Assignee: Ehom Inc., Seoul (KR)

( * ) Notice: Subject to any disclaimer, the term of this patent is extended or adjusted under 35 U.S.C. 154(b) by 465 days.

(21) Appl. No.: 11/789,312

(22) Filed: Apr. 24, 2007

(65) Prior Publication Data

US 2008/0077545 A1 Mar. 27, 2008

(30) Foreign Application Priority Data

Sep. 27, 2006 (KR) .................. 10-2006-0094286

(51) Int. Cl.
*G06N 5/00* (2006.01)
(52) U.S. Cl. ........................... 706/15; 706/45
(58) Field of Classification Search ............. 706/15, 706/45; 370/215, 352
See application file for complete search history.

(56) References Cited

U.S. PATENT DOCUMENTS

| 3,824,597 A | * | 7/1974 | Berg ........................ 370/215 |
| 5,867,494 A | * | 2/1999 | Krishnaswamy et al. .... 370/352 |
| 5,867,495 A | * | 2/1999 | Elliott et al. ............... 370/352 |

* cited by examiner

*Primary Examiner*—Wilbert L Starks, Jr.
(74) *Attorney, Agent, or Firm*—The Webb Law Firm

(57) ABSTRACT

Provided are a method and system for providing member-specific information, which are capable of building a digital neural network by improving negative functions of the current Internet, applying a paradigm of sound home- and lifestyle-oriented opened electronic home, and utilizing a closed groupware. The method for providing member-specific information in a digital neural network based on electronic home including My Rooms, Our Homes, and towns includes the steps of: setting an initial value of a variable; extracting a priority while changing a weight of the variable; targeting members using the extracted priority information; grouping the targeted members; and pushing information to the member group or interoperating the information.

10 Claims, 4 Drawing Sheets

PROCESS AND APPARATUS FOR REALIZING A DIGITAL NEURAL NETWORK USING ELECTRONIC FAMILY

BACKGROUND OF THE INVENTION

1. Field of the Invention

The present invention relates to groupware-based family homepages, and more particularly, to a method and system for providing member-specific information, which are capable of building a digital neural network by improving negative functions of the current Internet for a new paradigm of sound home- and lifestyle-oriented opened electronic homes and utilizing a closed groupware.

2. Description of the Related Art

With the development of the Internet, personal or family homepage services and community services for many people are being provided. However, family homepage services based on a groupware are not yet provided. The groupware may refer to a software or a system which can be operated independently by a specific group or community. The groupware-based homepage can have features of integrability, independence, and scalability.

Accordingly, there is a need for a service and system capable of managing information related to My Rooms, Our Homes, or towns in an integrated manner (integrability), operating the My Rooms, Our Homes, and towns as one independent entity (independence), and expanding the My Rooms to friends and Our Homes to relatives, neighbors, and towns without limit (scalability).

There is also a need for a method by which an enterprise can effectively manage customers using a service and system having the features of integrability, independence, and scalability. At present, many enterprises depend on only 'web-mail' and do not satisfactorily perform family marketing. Accordingly, the enterprises need a method and system capable of effectively building a family database for effective family marketing to customers.

SUMMARY OF THE INVENTION

The present invention provides a method and system for providing member-specific information, which are capable of building a digital neural network by improving negative functions of the current Internet for a new paradigm of sound home- and lifestyle-oriented opened electronic homes and utilizing a closed groupware in order to provide proper member-specific information through targeting and grouping.

According to an aspect of the present invention, there is provided a method for providing member-specific information in a digital neural network based on an electronic home including My Rooms, Our Homes, and towns, the method comprising the steps of: setting an initial value of a variable; extracting a priority while changing a weight of the variable; targeting members using the extracted priority information; grouping the targeted members; and pushing information to the member group or interoperating the information.

Preferably, the variable indicates feature information for the members, including gender, age, address, occupation, marital status, and member subscription date. Preferably, pushing information is implemented by mail, note, notice, and short message, and interoperating the information is implemented by banner advertisement.

Each My Room may be implemented by a personal mini-homepage or blog, and may include a storage space capable of storing personal contents. My Rooms may be associated with My Rooms in other Our Homes through making friends.

Preferably, each Our Home is associated with neighbors or relatives through making families. Preferably, each Our Home provides contents opened in My Rooms and family contents, the My Room contents may include schedule management, diary, will, note pad, personal blog, album, mail, note, and 1:1 chatting, and the family contents may include all sorts of matters, such as family newspapers, family memorial halls, genealogical tables, family blogs, family albums, moving images, video calls, Internet telephones, shopping, education, games, and home networking.

According to another aspect of the present invention, there is provided a system for providing member-specific information in a digital neural network based on electronic home including My Rooms, Our Homes, and towns, the system comprising: a priority extracting module for sorting members having a priority using an initial value and weight of a variable for members; a targeting module for targeting the members based on member data provided from the priority extracting module; a grouping module for grouping the members based on the member data provided from the targeting module; a pushing module for allowing a town manager to push information to each member; and a DB interoperating module for providing linking so that an opened homepage of each member interoperates with a closed town, wherein pushing the information by the pushing module and selecting members having a database to interoperate by the DB interoperating module are performed by the targeting module and the grouping module, respectively.

Preferably, the variable for use in the priority extracting module indicates feature information for members, including gender, age, address, occupation, marital status, and member subscription date. Preferably, pushing the information by the pushing module is implemented by mail, note, notice, and short message, and interoperating the information by the DB interoperating module is implemented by banner advertisement.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
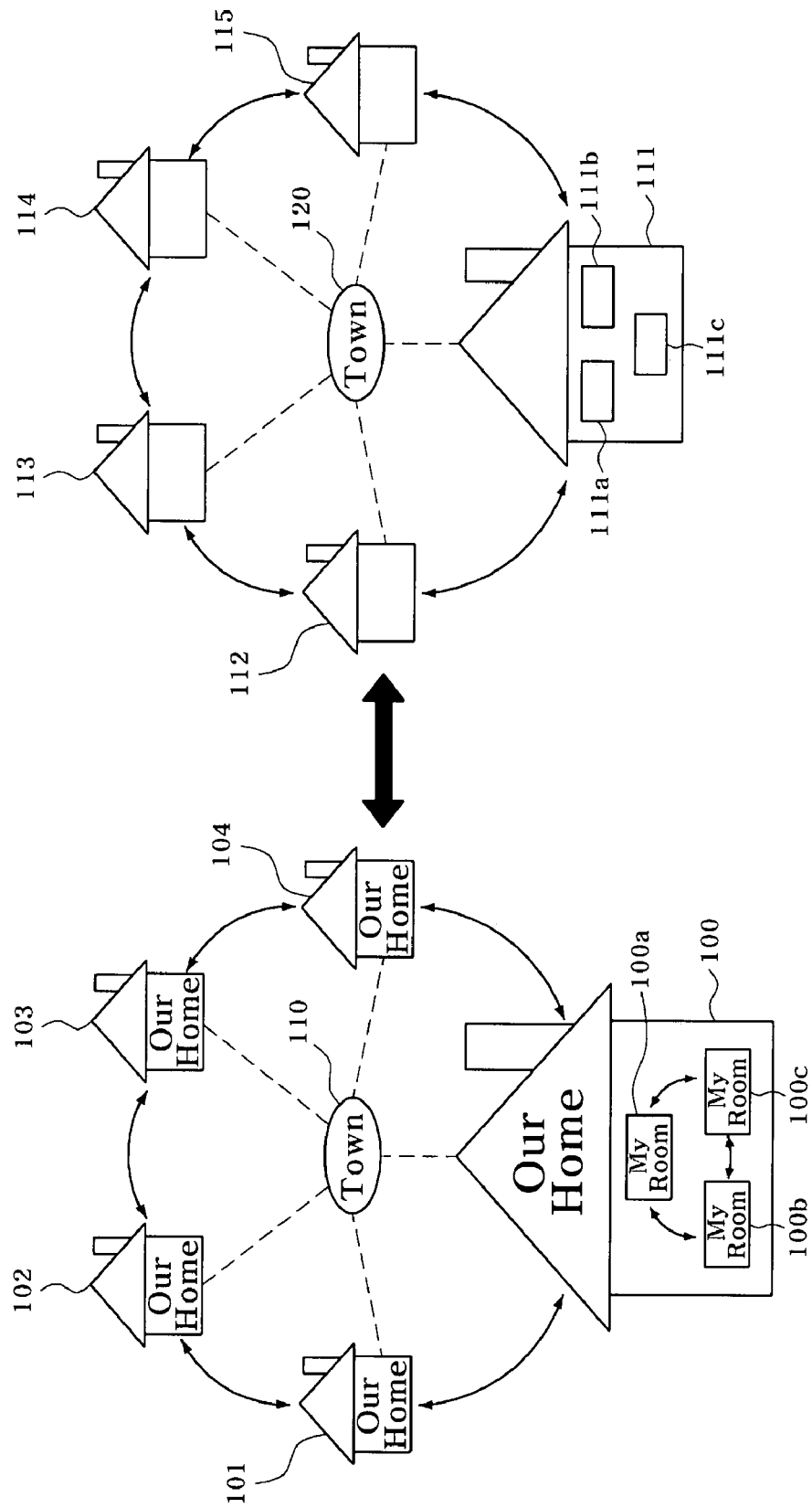
FIG. 1 schematically illustrates a digital neural network utilizing electronic home.

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout the specification.

FIG. 1 schematically illustrates a digital neural network utilizing electronic home.

Referring to FIG. 1, a digital neural network based on electronic home includes My Rooms 100a, 100b, 100c, 111a, 111b, and 111c, Our Homes 100, 101, 102, 103, 104, 111, 112, 113, 114, and 115, and towns 110 and 120. Each Our Home includes My Rooms of several family members, and several Our Homes build one town.

Specifically, the My Rooms 100a, 100b, 100c, 111a, 111b, and 111c are the smallest constituent units of the digital neural network based on an electronic home and are independent spaces of individuals that are members of the Our Home. Each My Room may be implemented by personal mini-homepage, blog, or the like and has a storage space capable of storing contents of each individual. The My Rooms 100a, 100b and 100c may be associated with My Rooms (not shown) of other Our Homes through making friends and with My Rooms 111a, 111b, and 111c belonging to another town 120.

The Our Homes 100, 101, 102, 103, 104, 111, 112, 113, 114, and 115 are places in which a user is allowed to converse with his or her family and a family's history can be recorded and kept. The Our Home is a space for only one family and is a center of the town. Several Our Homes are associated with neighbors or relatives through making a family. This Our Home provides contents opened in the My Rooms and family contents. The contents of the Our Home are selectively opened and serve as one family homepage.

The family homepage includes all contents related to one home and all personal contents of the My Rooms so that histories of one home and individuals can be recorded, kept and succeeded. The family contents may include all sorts of matters, such as family newspapers, family memorial halls, genealogical tables, family blogs, family albums, moving images, video calls, Internet telephones, shopping, education, games, home networking, etc. The contents of the My Room may include schedule management, diary, will, note pad, personal blog, album, mail, note, 1:1 chatting, etc.

Each of the towns 110 and 120 is configured of several Our Homes, and becomes a portal for the contents opened in the My Rooms 100a, 100b, 100c, 111a, 111b, and 111c and the Our Homes 100, 101, 102, 103, 104, 111, 112, 113, 114, and 115. The town can manage its Our Homes and push necessary information to the Our Homes. When a concept of a town is applied to an enterprise, it is utilized as a customer-extended groupware grouping customers and a town manager so that the enterprise provides information to the members and collects members' opinions using a new communication tool.

The town using concepts of 'groupware (Intranet)' and 'community' enables much conversation between users and an increase in a royalty revenue through the functions of all sorts of matters, guest boards, notices, albums, blogs, data boxes, etc.

Member management channels using the town management tool may include mail, note, notice, banner advertisement, survey, SMS, etc. The mail may include a mass mail forwarded to all members or a target mail forwarded to desired members. The note automatically pops up on monitor screens of members, is faster than the mail, and guarantees 100% recognition. The note has a capability of mass/target-specific notice or file delivery.

The notice can be exposed by directly pushing messages into all or targeted personal blogs (My Rooms) of the respective members. The banner advertisement exposes banners in all or targeted My Rooms of the members. The survey can be conducted on all or targeted My Rooms of the members. Specifically, a space for the survey is prepared at a right center of a homepage or blog of each member to collect all opinions of users on occasion. The SMS is for forwarding a short message to all members or to specific groups or members.

Figure 2:
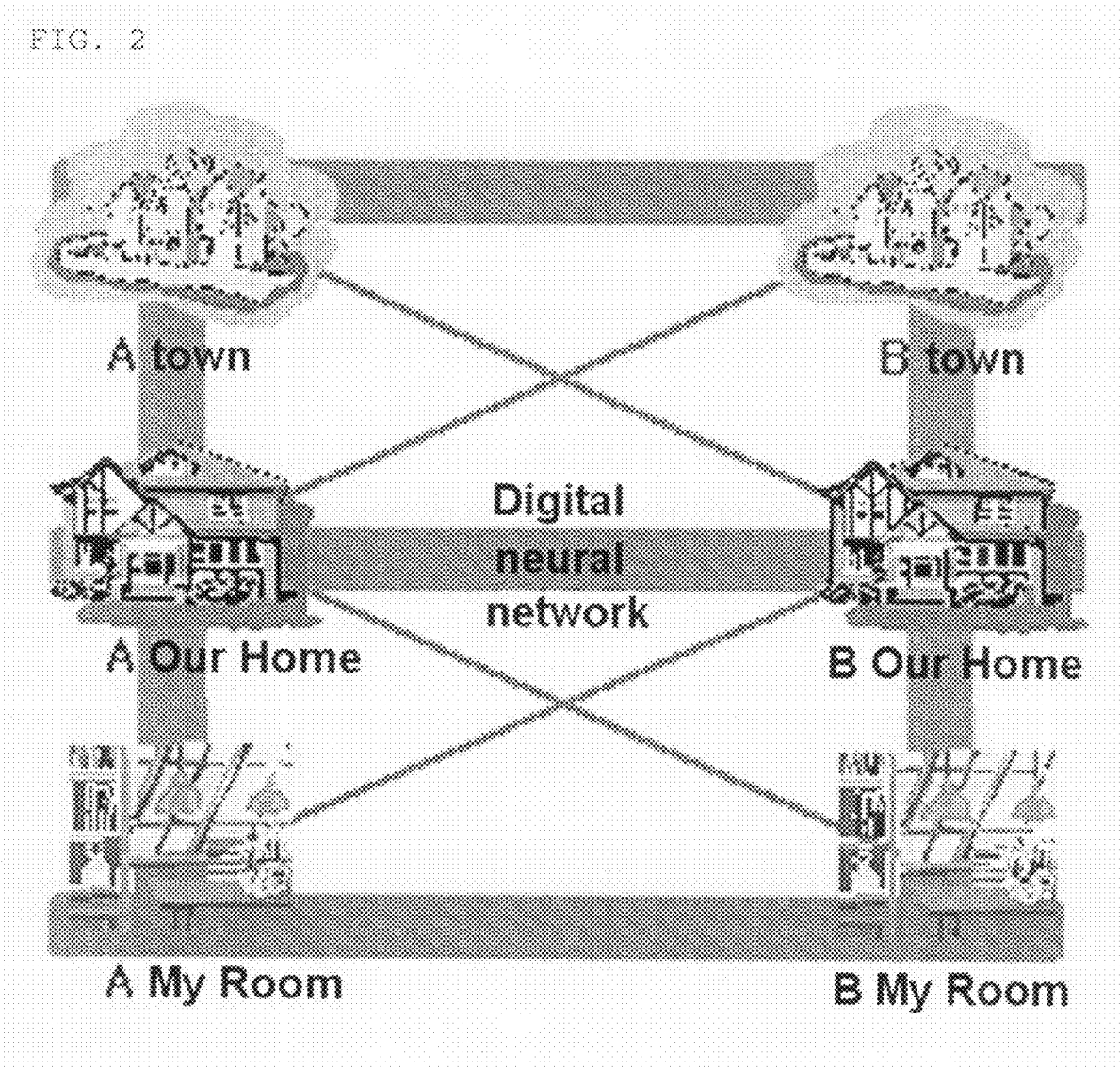
FIG. 2 illustrates a digital neural network utilizing electronic home.

FIG. 2 illustrates a digital neural network utilizing electronic home. Referring to FIG. 2, My Rooms, Our Homes, and towns are interconnected like a human body's neural network. Specifically, the My Room may be associated with the other My Room, the Our Home, and the town, and the My Room, the Our Home, and the town as nodes are associated with other nodes. Accordingly, the My Room or the Our Home is not a simple family homepage but a homepage enabling users to make friends with relatives or neighboring towns in the Our Home or with friends or acquaintances in My Room and converse with them.

This digital neural network can be very conveniently used by respective related groups for information exchange expansion at high speed.

Figure 3:
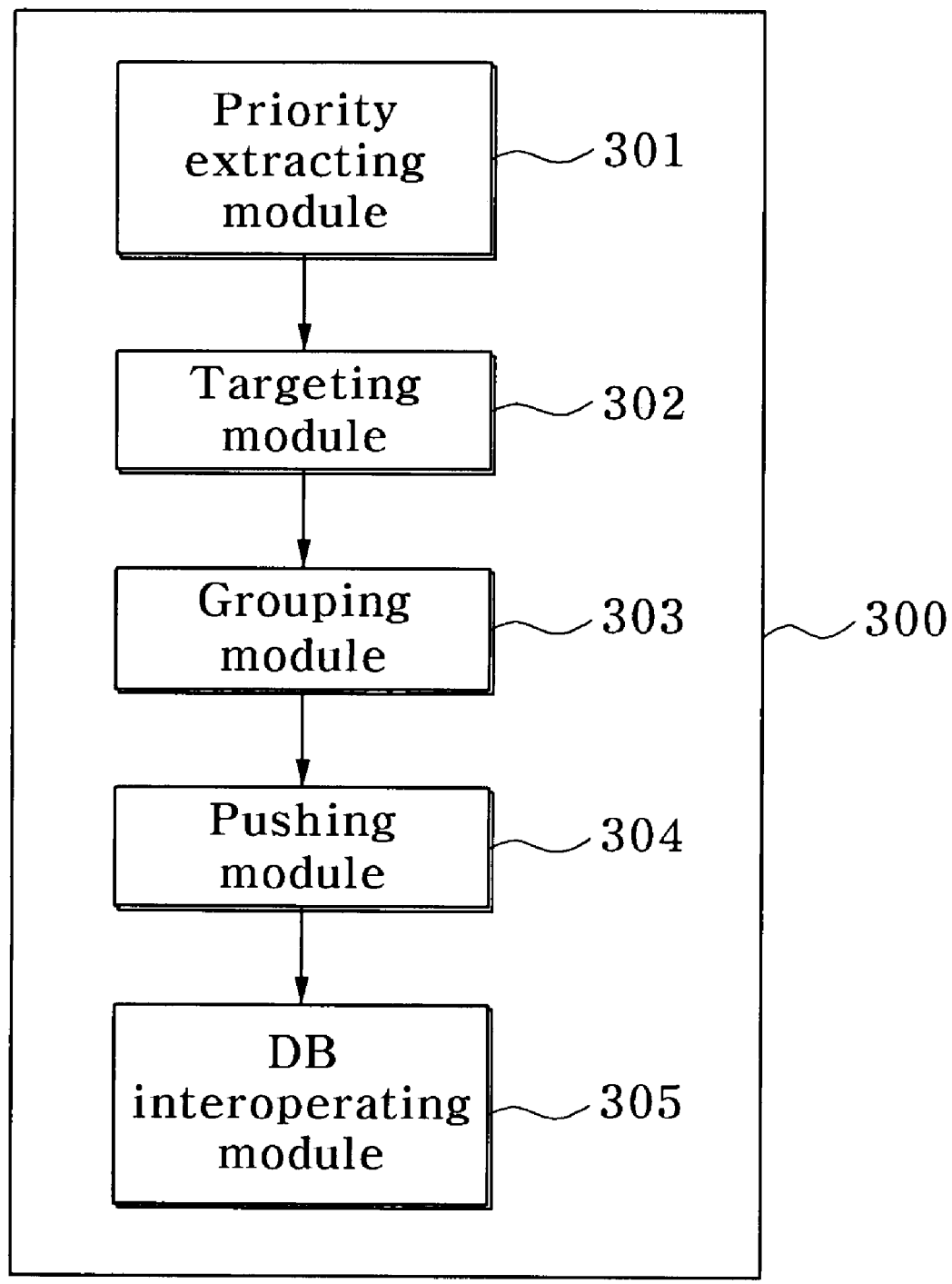
FIG. 3 is a block diagram of a system for providing member-specific information in a digital neural network utilizing electronic home.

FIG. 3 is a block diagram of a system for providing member-specific information in a digital neural network utilizing electronic home.

A system 300 for providing member-specific information in a digital neural network based on electronic home is used as a town management tool and includes a priority extracting module 301, a targeting module 302, a grouping module 303, a pushing module 304, and a database (DB) interoperating module 305. The priority extracting module 301 functions to sort a member having a priority using an initial value and weight of a variable for members. The targeting module 302 manages members who are targeted based on the member information provided from the priority extracting module 301. The grouping module 303 groups the members based on the member information provided from the targeting module 302. The pushing module 304 allows a town manager to push information to each member. The DB interoperating module 305 provides linking so that an opened homepage of each member interoperates with a closed town. Pushing the information by the pushing module and selecting members having a database to interoperate by the DB interoperating module are performed by the targeting module and the grouping module, respectively.

Figure 4:
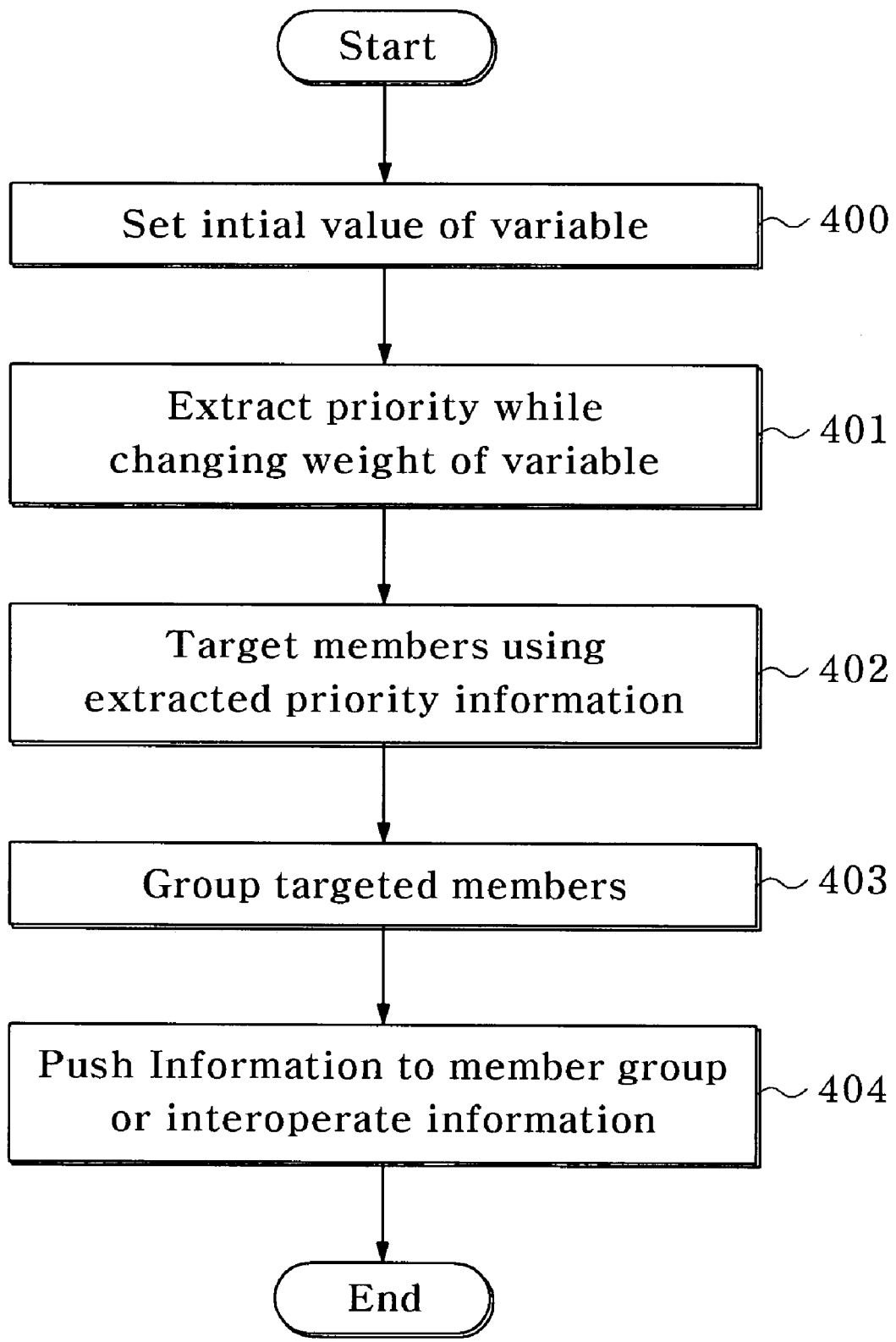
FIG. 4 is a flowchart illustrating a method for providing member-specific information in a digital neural network utilizing electronic home.

FIG. 4 is a flowchart illustrating a method for providing member-specific information in a digital neural network utilizing electronic home.

First, an initial value of a variable is set (S400). The variable represents feature information for members, such as gender, age, address, occupation, marital status, member subscription date, etc. The initial value is an initially set value of the variable and may be set for example to '1'.

A priority is extracted while changing a variable weight (S401). The weight is a value added to the initial value of the variables so that an important one of them is preferentially considered. If the age variable is the most important and the gender variable is the next important, a value of the age variable may be set to '1.5' and a value of the gender variable may be set to '1.2' by applying the weight. Accordingly, the priority can be extracted while changing the variable weight. Alternatively, the priority can be extracted by reflecting log data. That is, the priority can be extracted by using recent log-in time, recently used contents, a member's available point, and the like.

Members are then targeted using the extracted priority information (S402). Targeting the members refers to choosing desired members by substituting the extracted priority information for the member variable. For example, a group of married-members having a specific gender can be targeted by extracting the priorities.

The targeted members are then grouped (S403). Grouping the members refers to grouping members according to the weight of the variable. For example, members may be grouped according to the gender and then the age.

Information is then pushed to the member group or is interoperated (S404). The information may be pushed by means of mail, note, notice, and the like. Accordingly, following step S403, information to be pushed and interoperated may be preprocessed in a proper manner, such as an XML scheme, an image or music file scheme, and a DB scheme. Interoperating the information refers to the town manager automatically changing banners in the My Room. Here, the information is directly linked through the medium of the banners.

An exemplary application of a system and method for providing member-specific information in a digital neural network utilizing electronic home will now be described.

A system and method for providing member-specific information in a digital neural network utilizing an electronic home is applicable as a homeware service to general enterprises, authorities, groups. The homeware is a homepage and groupware combination service. The homepage is a web page which is first displayed when a user selects any site on a web. The groupware is software which is used for members' networked computers in enterprises, authorities, or groups to increase efficiency of tasks through cooperation. The homeware utilizes the functions of the groupware and the homepage.

Specifically, the homeware manager can manage members through mass/target mail, mass/target note, target-specific notice, target-specific banner advertisement, target-specific survey using the four modules of the system for providing member-specific information, i.e., the priority extracting module 301, the targeting module 302, the grouping module 303, the pushing module 304, and the DB interoperating module 305. That is, this service using the member management channel is available in a My Room of each member in real time.

As such, the homeware service is for attaining concentrated service by applying the groupware to a personal homepage. The homeware service significantly mitigates cost burden on groupware by means of ASP service, and accordingly, is suitable for enterprises, associations, groups, etc. which did not traditionally adopt a solution-type groupware because of its high cost.

Since the homepage service is operated in a manner in which members visit the homepage when they want, costly contents are not sufficiently utilized. However, use of the homeware service enables services for visiting members instead of waiting for them. Furthermore, use of a homeware solution enables users to easily obtain various information in the homepage since the homepage is indirectly positioned in an individual or family space. As a homepage manager operates the homepage directly, that is, not in a link form, the homepage is recognized as a company's community, mini homepage or blog, not as another site, which helps increase page views of the site.

As described above, according to the present invention, as the family homepage is built using the groupware concept, it has features of integrability, independence, and scalability. Accordingly, the information related to the My Rooms, Our Homes, or towns can be managed in an integrated manner, the My Rooms, Our Homes, and towns can be operated as one independent entity, and the My Rooms can be expanded into friends and Our Homes into relatives, neighbors, and towns without limit.

Furthermore, the Our Homes can be grouped to build a town. The mass mails, mass notes, moving images, target banner advertisements, target surveys, Our Home's notices can be managed by the town manager tool. This enables a town manager to effectively deliver information to the members via lots of information delivery channels.

In addition, the target can be set according to a database structure, a banner advertisement can be attached to rooms of targeted members, and a survey can be performed. This increases advertisement efficiency and survey accuracy. Thus, information can be selectively provided to persons or authorities needing the information.

Politically, by employing this digital neural network utilizing electronic homes, accurate sample extraction can be done and information can be provided to people or authorities needing the information. Accordingly, public opinion can be collected through real-time monitoring, achieving electronic participatory democracy. Economically, information and contents can be rapidly distributed and global competitiveness can be greatly improved. In addition, socially, family identification is established, traditional family culture and neighbor culture are restored for a sound society, and all sorts of matters at home are digitalized for sound utilitarianism culture.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing member-specific information in a digital neural network based on electronic home including My Rooms, Our Homes, and towns, the method comprising the steps of:
setting an initial value of a variable;
extracting a priority while changing a weight of the variable;
targeting members using the extracted priority information;
grouping the targeted members; and
pushing information to the member group or interoperating the information.

2. The method of claim 1, wherein the variable indicates feature information for the members, including gender, age, address, occupation, marital status, and member subscription date.

3. The method of claim 1, wherein pushing information is implemented by mail, note, notice, and short message, and interoperating the information is implemented by banner advertisement.

4. The method of claim 1, wherein each My Room is implemented by a personal mini-homepage or blog, and includes a storage space capable of storing personal contents.

5. The method of claim 1, wherein each My Room is associated with My Rooms in other Our Homes through making friends.

6. The method of claim 1, wherein each Our Home is associated with neighbors or relatives through making families.

7. The method of claim 1, wherein each Our Home provides contents opened in My Rooms and family contents, the My Room contents include schedule management, diary, will, note pad, personal blog, album, mail, note, and 1:1 chatting, and the family contents include all sorts of matters, such as family newspapers, family memorial halls, genealogical tables, family blogs, family albums, moving images, video calls, Internet telephones, shopping, education, games, and home networking.

8. A system for providing member-specific information in a digital neural network based on electronic home including My Rooms, Our Homes, and towns, the system comprising:

a priority extracting module for sorting members having a priority using an initial value and weight of a variable for members;

a targeting module for targeting the members based on member data provided from the priority extracting module;

a grouping module for grouping the members based on the member data provided from the targeting module;

a pushing module for allowing a town manager to push information to each member; and a DB interoperating module for providing linking so that an opened homepage of each member interoperates with a closed town, wherein pushing the information by the pushing module and selecting members having a database to interoperate by the DB interoperating module are performed by the targeting module and the grouping module, respectively.

9. The system of claim 8, wherein the variable for use in the priority extracting module indicates feature information for members, including gender, age, address, occupation, marital status, and member subscription date.

10. The system of claim 8, wherein pushing the information by the pushing module is implemented by mail, note, notice, and short message, and interoperating the information by the DB interoperating module is implemented by banner advertisement.

* * * * *